United States Patent
Kumar et al.

(10) Patent No.: US 10,626,772 B2
(45) Date of Patent: Apr. 21, 2020

(54) SCR EXHAUST AFTERTREATMENT APPARATUS, SYSTEM AND METHODS INCLUDING MULTIPLE WASHCOAT FORMULATIONS

(71) Applicant: Cummins Inc., Columbus, IN (US)

(72) Inventors: Askok Kumar, Columbus, IN (US); Krishna Kamasamudram, Columbus, IN (US); Jinyong Luo, Columbus, IN (US)

(73) Assignee: Cummins Inc., Columbus, IN (US)

(*) Notice: Subject to any disclaimer, the term of this patent is extended or adjusted under 35 U.S.C. 154(b) by 108 days.

(21) Appl. No.: 15/407,819

(22) Filed: Jan. 17, 2017

(65) Prior Publication Data

US 2017/0122175 A1 May 4, 2017

Related U.S. Application Data

(63) Continuation of application No. PCT/US2015/040926, filed on Jul. 17, 2015.

(Continued)

(51) Int. Cl.
*F01N 3/20* (2006.01)
*B01J 35/00* (2006.01)
(Continued)

(52) U.S. Cl.
CPC ....... *F01N 3/2803* (2013.01); *B01D 53/9418* (2013.01); *B01D 53/9477* (2013.01); *B01J 23/22* (2013.01); *B01J 29/072* (2013.01); *B01J 29/076* (2013.01); *B01J 35/0006* (2013.01); *F01N 3/035* (2013.01); *F01N 3/106* (2013.01); *F01N 3/2066* (2013.01);
(Continued)

(58) Field of Classification Search
None
See application file for complete search history.

(56) References Cited

U.S. PATENT DOCUMENTS 5,516,497 A * 5/1996 Speronello ......... B01D 53/9418
423/235
5,833,932 A 11/1998 Schmelz
(Continued)

FOREIGN PATENT DOCUMENTS

WO 2013014467 1/2013

OTHER PUBLICATIONS

Park, J. et al, "Emissions Control for Lean Gasoline Engines", Oak Ridge National Laboratory, May 16, 2013, 15 pages.
(Continued)

*Primary Examiner* — Walter D. Griffin
*Assistant Examiner* — Jelitza M Perez
(74) *Attorney, Agent, or Firm* — Taft Stettinius & Hollister LLP

(57) ABSTRACT

Unique SCR catalyst including multiple washcoat formulations with differing performance characteristics are disclosed. One exemplary embodiment is an apparatus including a catalyst substrate defining a plurality of flow channels leading from an inlet to an outlet, a first washcoat composition distributed over a first portion of the flow channels, and a second washcoat composition distributed over a second portion of the flow channels. The first washcoat composition has a lower ammonia storage density than the second washcoat composition.

23 Claims, 5 Drawing Sheets

Related U.S. Application Data

(60) Provisional application No. 62/026,232, filed on Jul. 18, 2014.

(51) Int. Cl.

| | | |
|---|---|---|
| *B01J 29/072* | (2006.01) | |
| *F01N 3/035* | (2006.01) | |
| *F01N 3/28* | (2006.01) | |
| *B01D 53/94* | (2006.01) | |
| *B01J 29/076* | (2006.01) | |
| *B01J 23/22* | (2006.01) | |
| *F01N 13/00* | (2010.01) | |
| *F01N 3/10* | (2006.01) | |

(52) U.S. Cl.
CPC ....... *F01N 13/009* (2014.06); *F01N 13/0097* (2014.06); *B01D 2255/20723* (2013.01); *B01D 2255/20738* (2013.01); *B01D 2255/20761* (2013.01); *B01D 2255/50* (2013.01); *B01D 2255/904* (2013.01); *B01D 2255/9032* (2013.01); *B01D 2255/911* (2013.01); *B01D 2255/9155* (2013.01); *B01D 2258/012* (2013.01); *F01N 2370/04* (2013.01); *F01N 2510/063* (2013.01); *F01N 2510/0682* (2013.01); *F01N 2610/02* (2013.01); *Y02T 10/24* (2013.01)

(56) References Cited

U.S. PATENT DOCUMENTS

| | | |
|---|---|---|
| 7,198,769 B2 | 4/2007 | Cichanowicz |
| 7,950,226 B2 | 5/2011 | McCarthy, Jr. et al. |
| 8,240,132 B2 | 8/2012 | Gandhi et al. |
| 8,302,379 B2 | 11/2012 | Narayanaswamy et al. |
| 8,318,103 B2 | 11/2012 | Gloeckle et al. |
| 8,516,798 B2 | 8/2013 | Dobson et al. |
| 8,617,497 B2 | 12/2013 | Adelmann et al. |
| 8,636,959 B2 | 1/2014 | Ando et al. |
| 2008/0141661 A1 | 6/2008 | Voss et al. |
| 2010/0115930 A1* | 5/2010 | Brown ............... F01N 3/035 60/297 |
| 2010/0242447 A1 | 9/2010 | Jasinkiewicz |
| 2011/0014099 A1 | 1/2011 | Dornhaus et al. |
| 2011/0123421 A1 | 5/2011 | Grubert |
| 2012/0117948 A1 | 5/2012 | Aslam et al. |
| 2012/0186229 A1 | 7/2012 | Phillips et al. |
| 2013/0156668 A1 | 6/2013 | Spurk et al. |
| 2013/0255229 A1 | 10/2013 | Doering |
| 2014/0106460 A1 | 4/2014 | Dobson et al. |
| 2014/0112852 A1* | 4/2014 | Mohanan ............ B01J 29/763 423/213.2 |
| 2014/0157763 A1 | 6/2014 | Chandler et al. |
| 2014/0271422 A1* | 9/2014 | Tang ................ B01J 23/22 423/212 |

OTHER PUBLICATIONS

PCT Search Report and Written Opinion, International Application No. PCT/US15/40926, dated Oct. 23, 2015, 11 pgs.

* cited by examiner

SCR EXHAUST AFTERTREATMENT APPARATUS, SYSTEM AND METHODS INCLUDING MULTIPLE WASHCOAT FORMULATIONS

BACKGROUND

The present application relates generally to selective catalytic reduction (SCR) exhaust aftertreatment apparatuses, systems and methods. SCR exhaust aftertreatment is an important technology for reducing emissions of oxides of Nitrogen (NOx) from internal combustion engines. Providing effective NOx reduction during a variety of operating conditions including, for example, steady state conditions, transient conditions, low temperature conditions, high temperature conditions, low load conditions, high load conditions and other conditions remains a significant challenge. There is a substantial need for the unique apparatuses, systems and methods disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One embodiment is a unique SCR catalyst including multiple washcoat formulations with differing performance characteristics. Further embodiments, forms, objects, features, advantages, aspects, and benefits shall become apparent from the following description and drawings.

DETAILED DESCRIPTION OF ILLUSTRATIVE EMBODIMENTS

Figure 1:
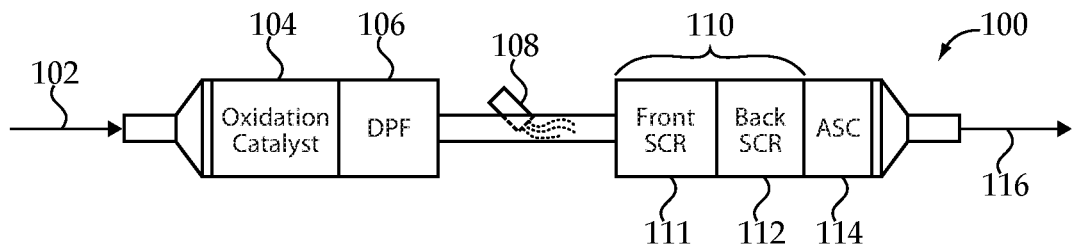
FIG. 1 illustrates an exemplary exhaust aftertreatment system.

With reference to FIG. 1 there is illustrated an exemplary exhaust aftertreatment system 100. As indicated by arrow 102, system 100 receives a flow of exhaust output by an internal combustion engine (not illustrated) such as a diesel engine. The flow of exhaust travels through an oxidation catalyst 104, which is structured to oxidize exhaust constituents such hydrocarbons, and a diesel particulate filter (DPF) 106 which is structured to remove particulate constituent matter from the flow of exhaust. In certain embodiments the oxidation catalyst may be structured to provide cold temperature hydrocarbon (HC) and NOx storage.

System 100 further includes a doser 108 which is structured to introduce reductant into the flow of exhaust. In certain preferred embodiments the reductant comprises an aqueous solution of urea such as diesel exhaust fluid (DEF) that decomposes into ammonia after injection into the exhaust flow. In further embodiments the reductant may comprise a gaseous reductant such as gaseous ammonia. The combined flow of exhaust and reductant is provided to an SCR catalyst 110 further details of which are described below. From SCR catalyst 110 the flow of exhaust proceeds to ammonia slip catalyst (ASC) 114. Treated exhaust is then output to the ambient environment through as indicated by arrow 116.

SCR catalyst 110 includes a front catalyst brick 111 and a rear catalyst brick 112. Catalyst bricks 111 and 112 comprise carrier structures defining a plurality of flow channels through which exhaust gasses may pass. A catalyst washcoat is provided on surfaces of the flow channels and is exposed to the exhaust passing through the flow channels. In certain preferred forms catalyst bricks 111 and 112 are structured as an extruded ceramic monolithic substrates including a plurality of parallel channels separated by thin walls that are coated with a catalyst washcoat. In various forms the channels may be round or polygonal (e.g., square or hexagonal). Various other configurations of catalyst bricks 111 and 112 are also contemplated.

Front catalyst brick 111 and rear catalyst brick 112 are provided with distinct catalyst washcoat formulations having differing compositions and differing performance characteristics. In one aspect the ammonia storage density of the catalyst washcoat of front catalyst brick 111 is lower than the ammonia storage density of the catalyst washcoat of the rear catalyst brick 112. Table 1 below lists several non-limiting examples of combinations of catalyst washcoat formulations that may be utilized for catalyst brick 111 and catalyst brick 112 such that catalyst brick 111 includes the Composition A and catalyst brick 112 includes the Composition B in each of the example combinations.

TABLE 1

Example Combinations of Catalyst Washcoat Formulations

| No. | Composition A | Composition B |
|---|---|---|
| 1. | Vanadia based formulation | Cu-zeolite formulation |
| 2. | Vanadia based formulation | Fe-zeolite formulation |

TABLE 1-continued

Example Combinations of Catalyst Washcoat Formulations

| No. | Composition A | Composition B |
| --- | --- | --- |
| 3. | Cu-zeolite formulation with low $NH_3$ storage density | Cu-zeolite formulation with high $NH_3$ storage density |
| 4. | Fe-zeolite formulation with low $NH_3$ storage density | Fe-zeolite formulation with high $NH_3$ storage density |
| 5. | Cu-zeolite formulation with low $NH_3$ storage density | Fe-zeolite formulation with high $NH_3$ storage density |
| 6. | Fe-zeolite formulation with low $NH_3$ storage density | Cu-zeolite formulation with high $NH_3$ storage density |

It shall be appreciated that each the foregoing example combinations of catalyst washcoat formulations as implemented in the embodiments disclosed herein provides an upstream SCR catalyst formulation which is compositionally distinct from a downstream SCR catalyst composition as opposed to simply providing different washcoat loading or effective loading by virtue of more dense substrate structure. It shall further be appreciated that the upstream SCR catalyst $NH_3$ storage may be substantially zero in certain embodiments, for example, in embodiments which utilize non-zeolite based catalyst formulations such as the Vanadia based formulations examples in Table 1 above.

It shall be appreciated that the Vanadia based formulations referred to herein are compositions including Vanadia as a constituent in the catalyst washcoat and possessing NOx conversion ability under various feed gas conditions. The Cu-zeolite and Fe-zeolite formulations referred to herein are compositions including Cu-zeolite or Fe-zeolite, respectively, as a constituent in the catalyst washcoat and possessing NOx conversion ability under various feed gas conditions.

It shall be further appreciated that ammonia storage density is a tunable parameter for a given catalyst washcoat composition. For example, for a given Cu-zeolite, by changing the copper amount or by incorporating a third element such as an alkaline earth element the ammonia storage density can be tuned to desired level. For a given Fe-zeolite, by changing the iron or ferrous constituent amount or by incorporating a third element such as an alkaline earth elements the ammonia storage density can be tuned to desired level. As a further examples, ammonia storage density can be tuned by changing the catalyst composition (e.g., changing the ratio of Silica to alumina), using a structurally different zeolite types (e.g., those having structures providing greater or lesser ammonia adsorption density), and/or varying the aging conditions of the catalyst washcoat. Combinations of these and other tuning techniques may also be utilized.

It shall also be appreciated that ammonia storage density can be expressed as in units of mass of stored ammonia per unit volume of catalyst or expressed as mass of stored ammonia per unit mass of catalyst. Furthermore, the low ammonia storage density and high ammonia storage density Cu-zeolite and Fe-zeolite formulations referred to herein connote relative differences in ammonia storage density. As notes above, various formulations of washcoats with a variety of ammonia storage properties can be prepared and utilized. Low ammonia storage density storage could range from as low as zero or substantially zero ammonia storage to relatively high ammonia storage. In one non-limiting example, low ammonia storage can be 0.1 to 1 grams of ammonia per liter of catalyst volume, and high ammonia storage can be 1-5 grams per liter of catalyst volume or other ranges greater than 1 gram per liter of catalyst volume.

It shall be appreciated that a variety of alternative embodiments of system 100 are also contemplated. Such embodiments may omit one or more of the components illustrated in FIG. 1 For example, one or more of oxidation catalyst 104, DPF 106, and ASC 114, may be omitted. Such embodiments may include other exhaust aftertreatment components in addition to or as alternatives to oxidation catalyst 104, DPF 106, and ASC 114. Furthermore, such embodiments may include oxidation catalyst 104, DPF 106, ASC 114, and/or additional components in different flow positions relative to one another from what is illustrated in FIG. 1 It shall be further appreciated that these alternatives are also contemplated for the exemplary systems illustrated in FIGS. 2-8 and described below.

Figure 2:
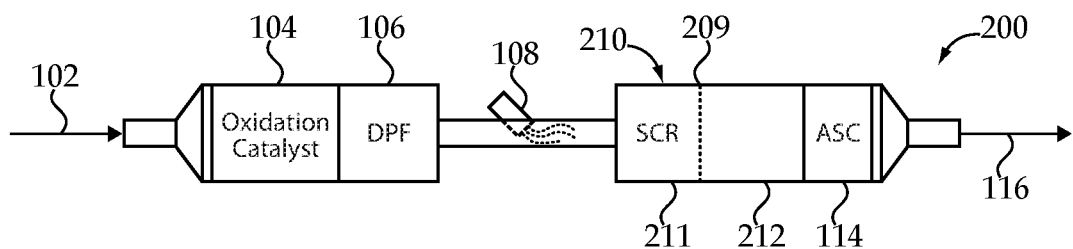
FIG. 2 illustrates another exemplary exhaust aftertreatment system.

With reference to FIG. 2, there is illustrated another exemplary exhaust aftertreatment system 200. System 200 includes many of the same components as system 100 described above in connection with FIG. 1 which are labeled with like reference numerals in FIG. 2. As noted above, the alternative embodiments and configurations of system 100 described above are also contemplated for system 200. System 200 further includes SCR catalyst 210 which includes a catalyst brick 209 defining a plurality of flow channels through which exhaust gasses may pass. A catalyst washcoat is provided on surfaces of the flow channels and is exposed to the exhaust passing through the flow channels. In certain preferred forms the catalyst brick 209 is structured as an extruded ceramic monolithic substrates including a plurality of parallel channels separated by thin walls that are coated with a catalyst washcoat. In various forms the channels may be round or polygonal (e.g., square or hexagonal). Various other configurations of catalyst bricks are also contemplated.

Catalyst brick 209 includes a front portion 211 and a rear portion 212. In one example embodiment front portion 211 extends over approximately ⅓ of the length of the catalyst brick 209 and a rear portion 212 extends over approximately ⅔ of the length of the catalyst brick 209. In another example embodiment front portion 211 and rear portion 212 each extend over approximately ½ of the length of the catalyst brick 209. Other embodiment utilize different proportions.

Front catalyst brick portion 211 and rear catalyst brick portion 212 are provided with distinct catalyst washcoat formulations having differing compositions and differing performance characteristics. In one aspect the ammonia storage density of the catalyst washcoat of front portion 211 is lower than the ammonia storage density of the catalyst washcoat of the rear portion 212. The non-limiting example combinations of catalyst washcoat formulations set forth in Table 1 above may be utilized for front portion 211 and rear portion 212 such that front portion 211 includes the Composition A and rear portion 212 includes the Composition B for each of the example combinations.

Figure 3:
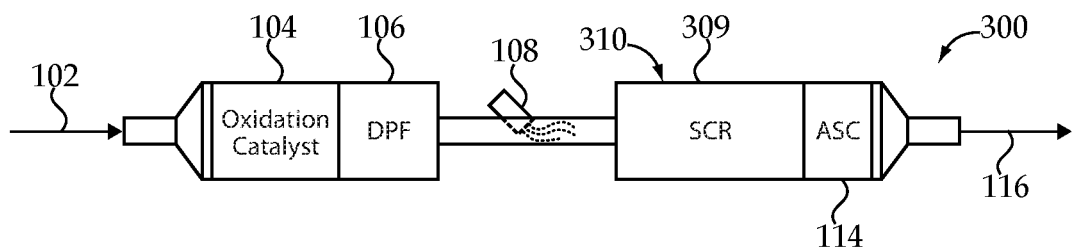
FIG. 3 illustrates another exemplary exhaust aftertreatment system.

With reference to FIG. 3, there is illustrated another exemplary exhaust aftertreatment system 300. System 300 includes many of the same components as system 100 described above in connection with FIG. 1 which are labeled with like reference numerals in FIG. 3. As noted above, the alternative embodiments and configurations of system 100 described above are also contemplated for system 300. System 300 includes SCR catalyst 310 which includes a catalyst brick 309 defining a plurality of flow channels through which exhaust gasses may pass. As described in further detail below multiple washcoat layers are provided on surfaces of the flow channels and is exposed to the exhaust passing through the flow channels. In certain preferred forms the catalyst brick 309 is structured as an extruded ceramic monolithic substrates including a plurality of parallel channels separated by thin walls that are coated with a catalyst washcoat. In various forms the channels may be round or polygonal (e.g., square or hexagonal). Various other configurations of catalyst bricks are also contemplated.

Figure 3A:
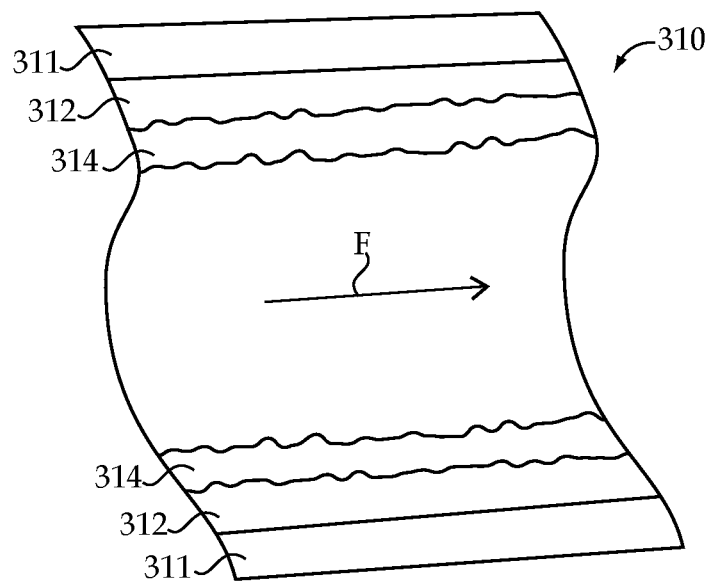
FIG. 3A illustrates an enlarged partial sectional view of an SCR catalyst of FIG. 3

With reference to FIG. 3A there is illustrated an enlarged partial sectional view of catalyst brick 309 depicting substrate walls 311, lower washcoat layers 312 disposed on walls 311, and upper washcoat layers 314 disposed washcoat layers 312. Washcoat layers 312 and 314 are provided with distinct catalyst washcoat formulations having differing compositions and differing performance characteristics. In one aspect the ammonia storage density of upper washcoat layer 314 is lower than the ammonia storage density of lower washcoat layer 312. The non-limiting example combinations of catalyst washcoat formulations set forth in Table 1 above may be utilized for washcoat layers 312 and 314 such that upper washcoat layer 314 includes the Composition A and lower washcoat layer 312 includes the Composition B for each of the example combinations.

Figure 4:
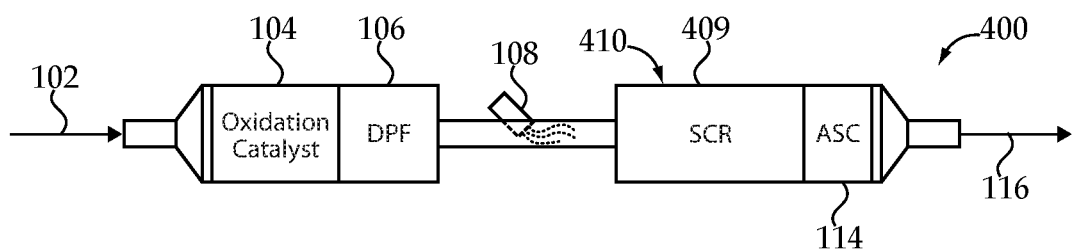
FIG. 4 illustrates another exemplary exhaust aftertreatment system.

With reference to FIG. 4, there is illustrated another exemplary exhaust aftertreatment system 400. System 400 includes many of the same components as system 100 described above in connection with FIG. 1 which are labeled with like reference numerals in FIG. 4. As noted above, the alternative embodiments and configurations of system 100 described above are also contemplated for system 400. System 400 includes SCR catalyst 410 which includes a catalyst brick 409 defining a plurality of flow channels through which exhaust gasses may pass. As described in further detail below a mixed formulation catalyst washcoat is provided on surfaces of the flow channels and is exposed to the exhaust passing through the flow channels. In certain preferred forms the catalyst brick 409 is structured as an extruded ceramic monolithic substrates including a plurality of parallel channels separated by thin walls that are coated with a catalyst washcoat. In various forms the channels may be round or polygonal (e.g., square or hexagonal). Various other configurations of catalyst bricks are also contemplated.

Figure 4A:
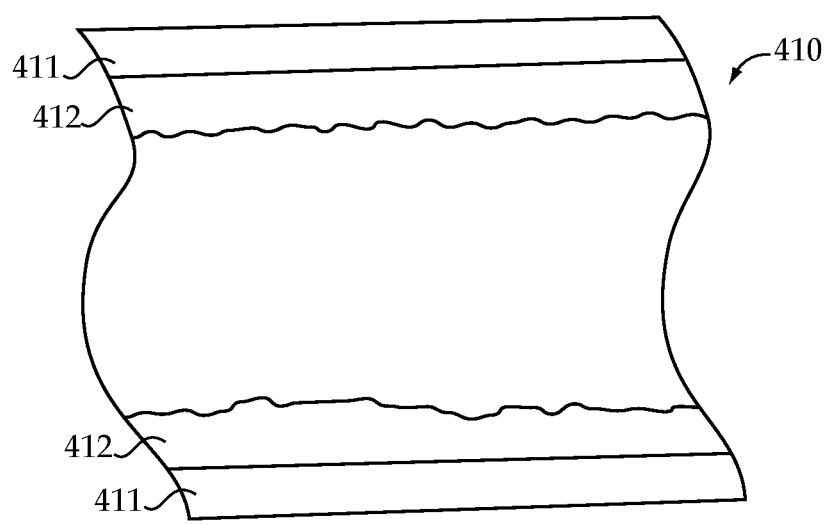
FIG. 4A illustrates an enlarged partial sectional view of an SCR catalyst of FIG. 4

With reference to FIG. 4A there is illustrated an enlarged partial sectional view of catalyst brick 409 depicting substrate walls 411 and mixed formulation catalyst washcoat layers 412 disposed on walls 411. Mixed catalyst washcoat layers 412 include a mixture of distinct catalyst washcoat formulations having differing compositions and differing performance characteristics. In one aspect the ammonia storage density of a first constituent of mixed catalyst washcoat layer 412 is lower than the ammonia storage density of a second constituent. In certain embodiments mixed catalyst washcoat layers 412 comprise a mixture of a Vanadia based formulation and a Cu-zeolite based formulation. In certain embodiments mixed catalyst washcoat layers 412 comprise a mixture of a Vanadia based formulation and a Fe-zeolite based formulation. In certain embodiments mixed catalyst washcoat layers 412 comprise a mixture of a Cu-zeolite formulation with low $NH_3$ storage density and a Cu-zeolite formulation with high $NH_3$ storage density. In certain embodiments mixed catalyst washcoat layers 412 comprise a mixture of a Fe-zeolite formulation with low $NH_3$ storage density and a Fe-zeolite formulation with high $NH_3$ storage density. In certain embodiments mixed catalyst washcoat layers 412 comprise a mixture of a Cu-zeolite formulation with low $NH_3$ storage density and a Fe-zeolite formulation with high $NH_3$ storage density. In certain embodiments mixed catalyst washcoat layers 412 comprise a mixture of a Fe-zeolite formulation with low $NH_3$ storage density and a Cu-zeolite formulation with high $NH_3$ storage density.

Figure 5:
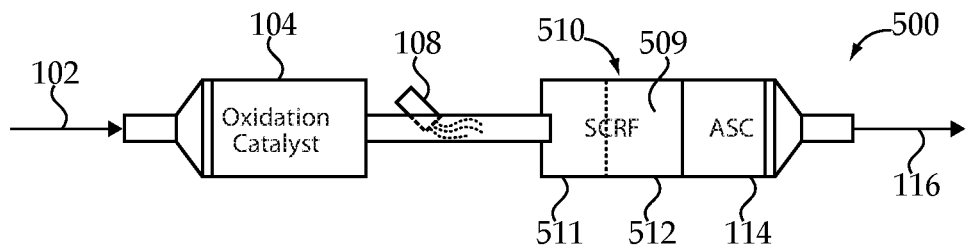
FIG. 5 illustrates another exemplary exhaust aftertreatment system.

With reference to FIG. 5, there is illustrated another exemplary exhaust aftertreatment system 500. System 500 includes many of the same components as system 100 described above in connection with FIG. 1 which are labeled with like reference numerals in FIG. 5. System 500 includes an SCR filter (SCRF) catalyst 510 rather than a separate SCR catalyst and DPF catalysts. SCRF 510 is structured to provide catalytic filtration of soot and particulate matter from exhaust and to also provide SCR catalytic reduction of NOx. SCRF 510 includes a carrier 509 which may be structured as a wall flow filter. Carrier 509 includes a plurality of flow channels through which exhaust gasses may pass. Catalyst washcoats are provided on surfaces of the flow channels such that the catalyst washcoats are exposed the exhaust passing through the flow channels. It shall be further appreciated that the alternative embodiments and configurations of system 100 described above are also contemplated for system 500.

Figure 5A:
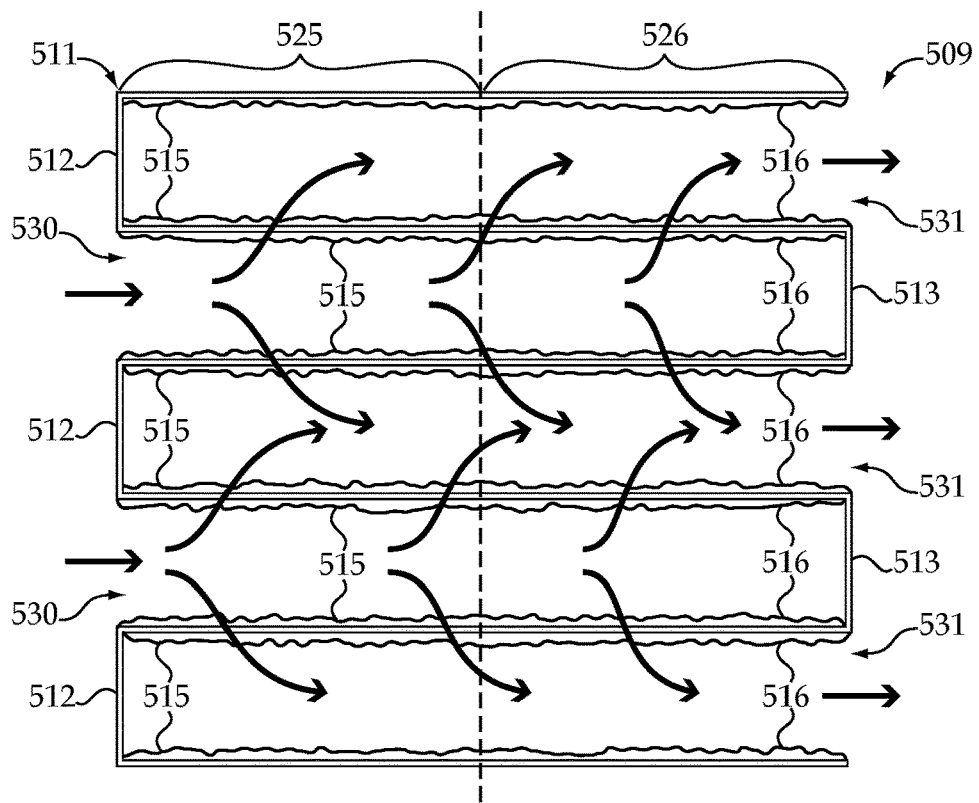
FIG. 5A illustrates an enlarged partial sectional view of an SCRF catalyst of FIG. 5.

With reference to FIG. 5A, there is illustrated a partial enlarged sectional view of carrier 509. In the illustrated embodiment carrier 509 is structured as a wall flow filter including wall structure 511 defining a plurality of flow channels which are configured with alternating closed ends 512 and open ends 530 at an upstream end of carrier 509 and alternating closed ends 513 and open ends 531 at a downstream end of carrier 509. As generally illustrated by the arrows of FIG. 5A, exhaust gasses and reductant may enter carrier 509 at open ends 350, flow through inlet flow channels in the direction toward closed ends 513, flow across the wall structure 511 of carrier 509 to adjacent outlet flow channels, and flow along outlet flow channels to open ends 531 and out of carrier 509.

Carrier 509 includes a front portion 525 and a rear portion 526. In one example embodiment front portion 525 extends over approximately ⅓ of the length of carrier 509 and a rear portion 526 extends over approximately ⅔ of the length of the carrier 509. In another example embodiment front portion 525 and rear portion 526 each extend over approximately ½ of the length of the carrier 509. Other embodiment utilize different proportions. Front portion 525 and rear portion 526 of carrier 509 are provided with distinct catalyst washcoat formulations having differing compositions and differing performance characteristics. In one aspect the ammonia storage density of the catalyst washcoat 515 of front portion 525 is lower than the ammonia storage density of the catalyst washcoat 516 of the rear portion 526. The non-limiting example combinations of catalyst washcoat formulations set forth in Table 1 above may be utilized for front portion 525 and rear portion 526 such that catalyst washcoat 515 of front portion 525 includes the Composition A and catalyst washcoat 516 of rear portion 526 includes the Composition B for each of the example combinations.

In the illustrated embodiment catalyst washcoat 515 is provided on the surfaces of both inlet channels and outlet channels within portion 525 and catalyst washcoat 516 is provided on the surfaces of both inlet channels and outlet channels within portion 526. This may be accomplished, for example, by applying washcoats 515 and 516 prior to forming closed ends 512 and 513. In other embodiments it is contemplated that catalyst compositions 515 may be provided only on the inlet channels and catalyst compositions 516 may be provided only on the outlet channels.

Figure 6:
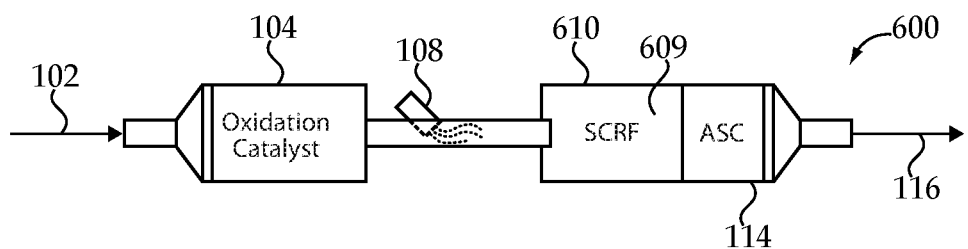
FIG. 6 illustrates another exemplary exhaust aftertreatment system.

With reference to FIG. 6, there is illustrated another exemplary exhaust aftertreatment system 600. System 600 includes many of the same components as system 100 described above in connection with FIG. 1 which are labeled with like reference numerals in FIG. 6. System 600 includes an SCR filter (SCRF) catalyst 610 rather than a separate SCR catalyst and DPF catalysts. SCRF 610 is structured to provide catalytic filtration of soot and particulate matter from exhaust and to also provide SCR catalytic reduction of NOx. SCRF 610 includes a carrier 609 which may be structured as a wall flow substrate. Carrier 609 includes a plurality of flow channels through which exhaust gasses may pass. Catalyst washcoats are provided on surfaces of the flow channels such that the catalyst washcoats are exposed the exhaust passing through the flow channels. It shall be further appreciated that the alternative embodiments and configurations of system 100 described above are also contemplated for system 600.

Figure 6A:
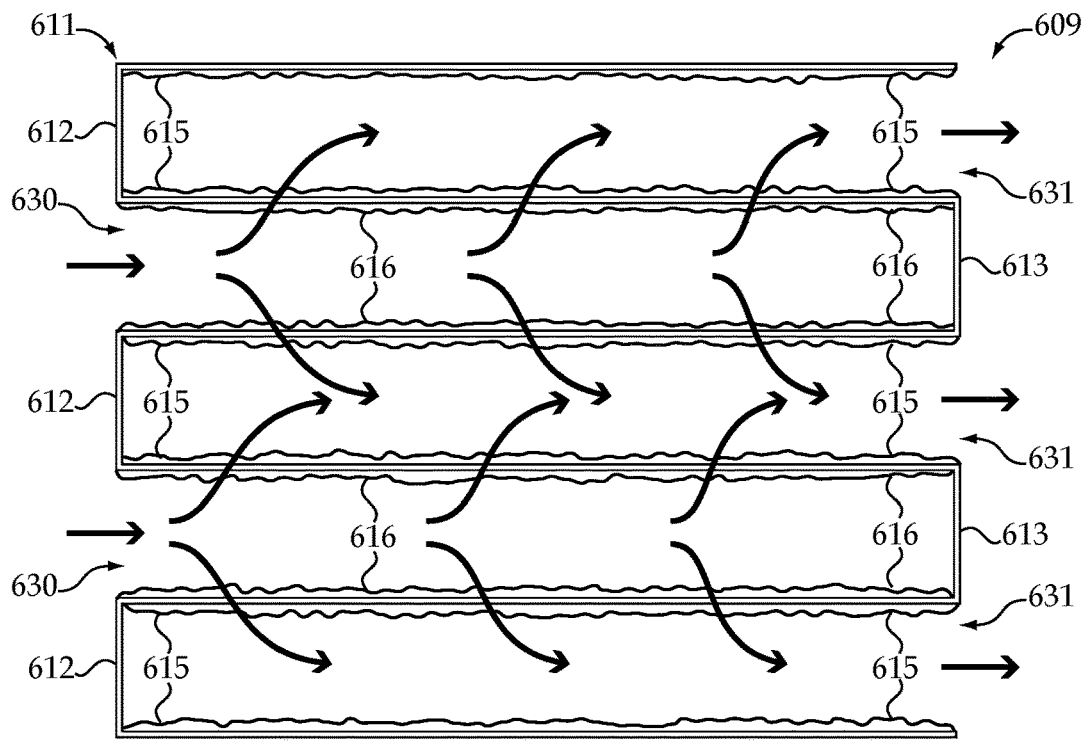
FIG. 6A illustrates an enlarged partial sectional view of an SCRF catalyst of FIG. 6.

With reference to FIG. 6A, there is illustrated a partial enlarged sectional view of carrier 609. In the illustrated embodiment carrier 609 is structured as a wall flow filter including wall structure 611 defining a plurality of flow channels which are configured with alternating closed ends 612 and open ends 630 at an upstream end of carrier 609 and alternating closed ends 613 and open ends 631 at a downstream end of carrier 609. As generally illustrated by the arrows of FIG. 6A, exhaust gasses and reductant may enter carrier 609 at open ends 630, flow through inlet flow channels in the direction toward closed ends 613, flow across the wall structure 611 of carrier 609 to adjacent outlet flow channels, and flow along outlet flow channels to open ends 631 and out of carrier 609. When traveling along this flow path exhaust gasses and reductant first encounter catalyst washcoat 615 which is disposed on the inlet flow channels of carrier 609. After passing through wall structure 611 to adjacent outlet flow channels, exhaust gasses and reductant next encounter catalyst washcoat 616 which is disposed on the inlet flow channels of carrier 609.

The inlet channels and outlet channels of carrier 509 are provided with distinct catalyst washcoat formulations having differing compositions and differing performance characteristics. In one aspect the ammonia storage density of the catalyst washcoat 616 of the inlet channels is lower than the ammonia storage density of the catalyst washcoat 615 of the outlet channels. The non-limiting example combinations of catalyst washcoat formulations set forth in Table 1 above may be utilized for inlet channels and outlet channels such that catalyst washcoat 6116 includes the Composition A and catalyst washcoat 615 includes the Composition B for each of the example combinations.

Figure 7:
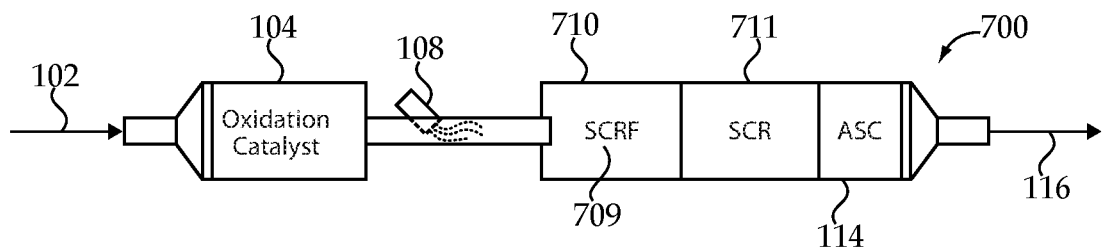
FIG. 7 illustrates another exemplary exhaust aftertreatment system.

With reference to FIG. 7, there is illustrated another exemplary exhaust aftertreatment system 700. System 700 includes many of the same components as system 100 described above in connection with FIG. 1 which are labeled with like reference numerals in FIG. 7. System 700 includes an SCRF catalyst 710 including a carrier 709 which may be structured as described above in connection with systems 500 and 600. System 700 further includes an SCR catalyst 711 which may be generally structured as SCR catalyst 110 described above in connection with FIG. 1. It shall be further appreciated that the alternative embodiments and configurations of system 100 described above are also contemplated for system 700.

SCRF catalyst 710 and SCR catalyst 711 may be provided with distinct catalyst washcoat formulations having differing compositions and differing performance characteristics. In one aspect the ammonia storage density of SCRF catalyst 710 is lower than the ammonia storage density of the catalyst washcoat of the SCR catalyst 711. The non-limiting example combinations of catalyst washcoat formulations set forth in Table 1 above may be utilized for SCRF catalyst 710 and SCR catalyst 709 such that portions of or substantially all of one or both of the inlet flow channels and the outlet flow channels of carrier 709 includes the Composition A and the flow channels of SCR catalyst 711 includes the Composition B for each of the example combinations.

Figure 8:
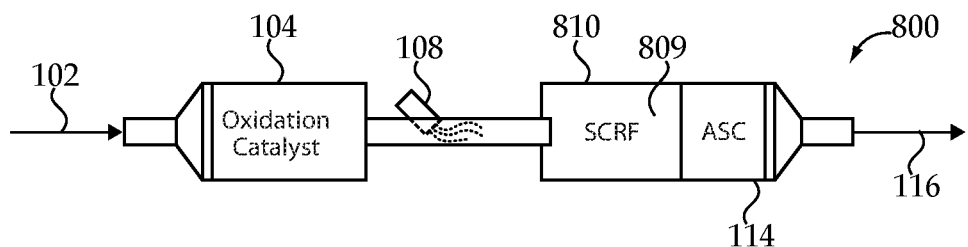
FIG. 8 illustrates another exemplary exhaust aftertreatment system.

With reference to FIG. 8, there is illustrated another exemplary exhaust aftertreatment system 800. System 800 includes many of the same components as system 100 described above in connection with FIG. 1 which are labeled with like reference numerals in FIG. 8. System 800 includes an SCRF catalyst 810 including a carrier 809 which may be structured as described above in connection with systems 500 and 600. It shall be further appreciated that the alternative embodiments and configurations of system 100 described above are also contemplated for system 800.

Portions or substantially the all of one or both of the inlet flow channels and the outlet flow channels of carrier 809 of SCRF catalyst 810 bay be provided with mixed formulation catalyst washcoat layers. The mixed catalyst washcoat layers include a mixture of distinct catalyst washcoat formulations having differing compositions and differing performance characteristics. In one aspect the ammonia storage density of a first constituent of mixed catalyst washcoat layers is lower than the ammonia storage density of a second constituent. In certain embodiments mixed catalyst washcoat layers comprise a mixture of a Vanadia based formulation and a Cu-zeolite based formulation. In certain embodiments mixed catalyst washcoat layers comprise a mixture of a Vanadia based formulation and a Fe-zeolite based formulation. In certain embodiments mixed catalyst washcoat layers comprise a mixture of a Cu-zeolite formulation with low $NH_3$ storage density and a Cu-zeolite formulation with high $NH_3$ storage density. In certain embodiments mixed catalyst washcoat layers comprise a mixture of a Fe-zeolite formulation with a low $NH_3$ storage density and a Fe-zeolite formulation with a high $NH_3$ storage density. In certain embodiments mixed catalyst washcoat layers comprise a mixture of a Cu-zeolite formulation with low $NH_3$ storage density and a Fe-zeolite formulation with high $NH_3$ storage density. In certain embodiments mixed catalyst washcoat layers comprise a mixture of a Fe-zeolite composition with low $NH_3$ storage density and a Cu-zeolite composition with high $NH_3$ storage density.

Figure 9:
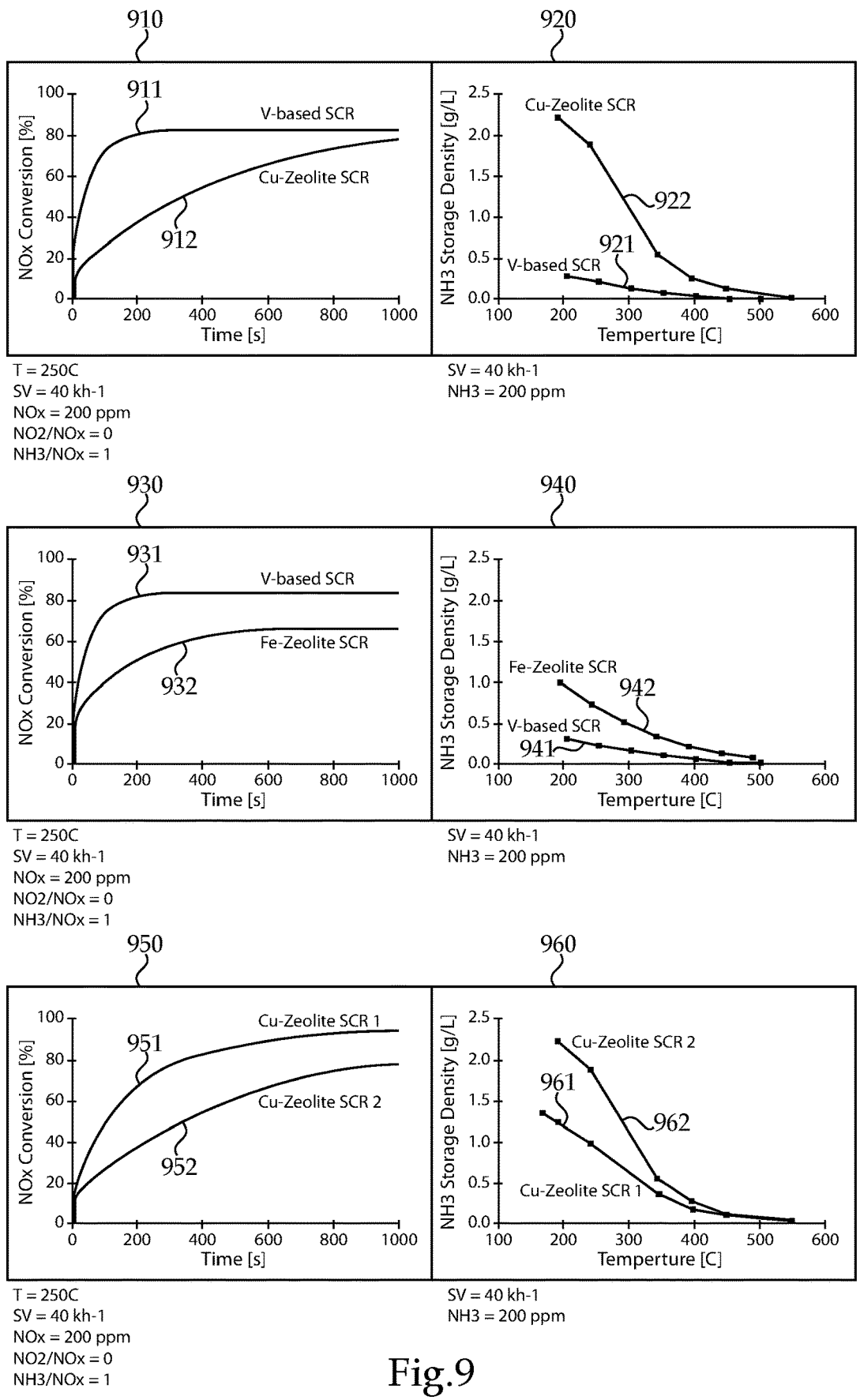
FIG. 9 and illustrates graphs depicting the performance differences of a plurality of combinations of catalyst washcoat formulations.

With reference to FIG. 9 there are illustrated a number of graphs depicting the different performance characteristics of different catalyst formulations. Graph 910 illustrates curve 911 showing NOx conversion of a Vanadia-based formulation as a function of time and curve 912 showing NOx conversion of a Cu-zeolite based formulation as a function of time. It shall be appreciated that curve 911 reaches a plateau level of NOx conversion more rapidly than curve 912. It shall be further appreciated that the plateau reached by curve 911 may be lower at higher temperature values such that curve 912 crosses it and has a higher level of NOx conversion after a certain amount of time at elevated temperature.

Graph 920 illustrates curve 921 showing the $NH_3$ storage density of a Vanadia-based formulation as a function of temperature and curve 922 showing the $NH_3$ storage density of a Cu-zeolite based formulation as a function of temperature. It shall be appreciated that the Vanadia based formulation exhibits lower $NH_3$ storage density at all temperatures and is substantially zero at certain temperatures.

Graphs 930 and 940 illustrate similar relationships and characteristics for Vanadia based catalyst formulation curves 931 and 941 and Fe-zeolite based catalyst formulation curves 932 and 942 as described in connection with the corresponding catalyst formulation curves of graphs 910 and 920. Similarly, graphs 950 and 960 illustrate similar relationships and characteristics for Vanadia based catalyst formulation curves 951 and 961 and Fe-zeolite based catalyst formulation curves 952 and 962 as described in connection with the corresponding catalyst formulation curves of graphs 910 and 920.

A number of further exemplary embodiments shall now be described. One embodiment is an apparatus comprising a catalyst substrate including a plurality of surfaces defining a plurality of flow channels leading from an inlet to an outlet; and a first washcoat composition and a second washcoat composition deposited on surfaces of the catalyst substrate defining the flow channels; wherein the first washcoat composition comprises one of a Vanadia composition, a low $NH_3$ storage density Cu-zeolite formulation, and a low $NH_3$ storage Fe-zeolite formulation, and the second layer comprises one of a Cu-zeolite formulation and a Fe-zeolite formulation. In certain forms the catalyst substrate is an SCR catalyst. In certain forms the SCR catalyst substrate includes a front catalyst brick positioned upstream from a rear catalyst brick, the first washcoat composition is provided on the front catalyst brick, and the second washcoat composition is provided on the rear brick. In certain forms the first washcoat composition is provided on the front portion of a catalyst brick, and the second washcoat composition is provided on a rear portion of the same catalyst brick. In certain forms the second washcoat composition is provided as a first layer disposed on the surfaces of the SCR catalyst substrate and the first washcoat composition is provided as a second layer disposed on the first layer. In certain forms the first washcoat composition and the second washcoat composition are admixed on the surfaces of the SCR catalyst substrate. In certain forms the catalyst substrate is an SCRF catalyst substrate including a flowpath through at least one inlet channel, across a wall structure of the substrate, and through at least one outlet channel. In certain forms the first washcoat composition is provided on the front portion of the substrate, and the second washcoat composition is provided on a rear portion of the substrate. In certain forms the first washcoat composition is provided on the at least on inlet channel, and the second washcoat composition is provided on the at least one outlet channel. In certain forms the first washcoat composition and the second washcoat composition are admixed on surfaces of the substrate.

One embodiment is an exhaust aftertreatment system comprising an inlet structured to receive a flow of exhaust produced by an engine; an injector positioned downstream from the inlet and structured to inject reductant into the flow of exhaust; and an SCRF catalyst positioned downstream from the injector, the SCRF catalyst comprising a particulate filter substrate including a plurality of flow channels, a first washcoat composition deposited on first surfaces of the flow channels in a first region along the length of the substrate, and a second washcoat composition deposited on second surfaces of the flow channels in a second region along the length of the substrate, the second region being downstream from the first region, the first washcoat composition having a lower $NH_3$ storage density than the second washcoat composition. In certain forms the first washcoat composition comprises a Vanadia composition, and the second washcoat composition comprises one of a Cu-zeolite formulation having higher $NH_3$ storage density than the Vanadia composition and a Fe-zeolite formulation having higher $NH_3$ storage density than the Vanadia composition. In certain forms the first washcoat composition comprises a first Cu-zeolite formulation, and the second washcoat composition comprises one of a second Cu-zeolite formulation having higher $NH_3$ storage density than the first Cu-zeolite composition and a Fe-zeolite formulation having higher $NH_3$ storage density than the first Cu-zeolite composition. In certain forms the first washcoat composition comprises a first Fe-zeolite formulation, and the second washcoat composition comprises one of a Cu-zeolite formulation having higher $NH_3$ storage density than the first Fe-zeolite composition and a second Fe-zeolite formulation having higher $NH_3$ storage density than the first Fe-zeolite composition. Certain forms further include an oxidation catalyst positioned downstream from the inlet and upstream form the injector, and an Ammonia slip catalyst positioned downstream from the SCRF catalyst.

One embodiment is an exhaust aftertreatment system comprising an inlet structured to receive a flow of exhaust produced by an engine; an injector positioned downstream from the inlet and structured to inject reductant into the flow of exhaust; and an SCRF catalyst positioned downstream from the injector, the SCRF catalyst comprising a particulate filter substrate including a plurality of inlet flow channels and a plurality of outlet flow channels, a first washcoat composition deposited on surfaces of inlet flow channels, and a second washcoat composition deposited on surfaces of the outlet flow channels, the first washcoat composition having a lower $NH_3$ storage density than the second washcoat composition. In certain forms the first washcoat composition comprises a Vanadia composition, and the second washcoat composition comprises one of a Cu-zeolite formulation having higher $NH_3$ storage density than the Vanadia composition and a Fe-zeolite formulation having higher $NH_3$ storage density than the Vanadia composition. In certain forms the first washcoat composition comprises a first Cu-zeolite formulation, and the second washcoat composition comprises one of a second Cu-zeolite formulation having higher $NH_3$ storage density than the first Cu-zeolite composition and a Fe-zeolite formulation having higher $NH_3$ storage density than the first Cu-zeolite composition. In certain forms the first washcoat composition comprises a first Fe-zeolite formulation, and the second washcoat composition comprises one of a Cu-zeolite formulation having higher $NH_3$ storage density than the first Fe-zeolite composition and a second Fe-zeolite formulation having higher $NH_3$ storage density than the first Fe-zeolite composition. Certain forms further comprise an oxidation catalyst positioned downstream from the inlet and upstream form the injector, and an Ammonia slip catalyst positioned downstream from the SCRF catalyst.

One embodiment is exhaust aftertreatment system comprising an inlet structured to receive a flow of exhaust produced by an engine; an injector positioned downstream from the inlet and structured to inject reductant into the flow of exhaust; and an SCRF catalyst positioned downstream from the injector, the SCRF catalyst comprising a particulate filter substrate including a plurality of flow channels, and a combination of a first washcoat composition and a second washcoat composition deposited on surfaces of the flow channels, the first washcoat composition having a lower $NH_3$ storage density than the second washcoat composition. In certain forms the combination of the first washcoat composition and the second washcoat composition comprises a mixture of the first washcoat composition and the second washcoat composition. In certain forms the combination of the first washcoat composition and the second washcoat composition comprises a layered structure wherein the first washcoat composition is deposited on the second washcoat composition and the second washcoat composition is deposited on the surfaces of the flow channels. In certain forms the first washcoat composition comprises one of a Vanadia composition, a low $NH_3$ storage density Cu-zeolite formulation, and a low $NH_3$ storage Fe-zeolite formulation, and the second layer comprises one of a Cu-zeolite formulation and a Fe-zeolite formulation. Certain forms further comprise an oxidation catalyst positioned downstream from the inlet and upstream form the injector, and an Ammonia slip catalyst positioned downstream from the SCRF catalyst.

One embodiment is an exhaust aftertreatment system comprising an inlet structured to receive a flow of exhaust produced by an engine; an injector positioned downstream from the inlet and structured to inject reductant into the flow of exhaust; and an SCRF catalyst positioned downstream from the injector, the SCRF catalyst comprising a particulate filter substrate including a plurality of flow channels and a first washcoat composition deposited on surfaces of the flow channels; and an SCR catalyst positioned downstream from the SCRF catalyst, the SCR catalyst comprising a second washcoat composition having a higher $NH_3$ storage density than the first washcoat composition. In certain forms the first washcoat composition comprises a Vanadia composition, and the second washcoat composition comprises one of a Cu-zeolite formulation having higher $NH_3$ storage density than the Vanadia composition and a Fe-zeolite formulation having higher $NH_3$ storage density than the Vanadia composition. In certain forms the first washcoat composition comprises a first Cu-zeolite formulation, and the second washcoat composition comprises one of a second Cu-zeolite formulation having higher $NH_3$ storage density than the first Cu-zeolite composition and a Fe-zeolite formulation having higher $NH_3$ storage density than the first Cu-zeolite composition. In certain forms the first washcoat composition comprises a first Fe-zeolite formulation, and the second washcoat composition comprises one of a Cu-zeolite formulation having higher $NH_3$ storage density than the first Fe-zeolite composition and a second Fe-zeolite formulation having higher $NH_3$ storage density than the first Fe-zeolite composition. Certain forms further comprise an oxidation catalyst positioned downstream from the inlet and upstream form the injector, and an Ammonia slip catalyst positioned downstream from the SCRF catalyst.

One embodiment is an apparatus comprising a catalyst substrate defining a plurality of flow channels leading from an inlet to an outlet; a first washcoat composition distributed over a first portion of the flow channels; and a second washcoat composition distributed over a second portion of the flow channels; wherein the first washcoat composition has a lower ammonia storage density than the second washcoat composition.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An exhaust aftertreatment system comprising:
   an inlet structured to receive a flow of exhaust produced by an engine;
   an injector positioned downstream from the inlet and structured to inject reductant into the flow of exhaust; and
   a selective catalytic reduction filter (SCRF) catalyst positioned downstream from the injector, the SCRF catalyst comprising a particulate filter substrate including a plurality of inlet flow channels and a plurality of outlet flow channels, a first washcoat composition deposited on surfaces of inlet flow channels, and a second washcoat composition deposited on surfaces of the outlet flow channels, the first washcoat composition having a lower $NH_3$ storage density than the second washcoat composition by changing an amount of at least one chemical element in the respective compositions that is common to the first and second washcoat compositions.

2. The system of claim 1, wherein the first washcoat composition comprises a first Cu-zeolite formulation, and the second washcoat composition comprises one of a second Cu-zeolite formulation having higher $NH_3$ storage density than the first Cu-zeolite composition and a Fe-zeolite formulation having higher $NH_3$ storage density than the first Cu-zeolite composition.

3. The system of claim 1, wherein the first washcoat composition comprises a first Fe-zeolite formulation, and the second washcoat composition comprises one of a Cu-zeolite formulation having higher $NH_3$ storage density than the first Fe-zeolite composition and a second Fe-zeolite formulation having higher $NH_3$ storage density than the first Fe-zeolite composition.

4. The system of claim 1, comprising an oxidation catalyst positioned downstream from the inlet and upstream from the injector, and an ammonia slip catalyst positioned downstream from the SCRF catalyst.

5. The system of claim 1, wherein the system does not include a separate SCR catalyst in addition to the SCRF catalyst.

6. The system of claim 1, wherein the first washcoat composition has an ammonia storage of 0.1 to 1 grams of ammonia per liter of catalyst volume.

7. The system of claim 6, wherein the second washcoat composition has an ammonia storage density of 1 to 5 grams per liter of catalyst volume.

8. The system of claim 1, wherein the second washcoat composition has an ammonia storage density of 1 to 5 grams per liter of catalyst volume.

9. The system of claim 8, wherein the first washcoat composition has an ammonia storage of 0.1 to 1 grams of ammonia per liter of catalyst volume.

10. An exhaust aftertreatment system comprising:
    an inlet structured to receive a flow of exhaust produced by an engine;
    an injector positioned downstream from the inlet and structured to inject reductant into the flow of exhaust; and
    a selective catalytic reduction filter (SCRF) catalyst positioned downstream from the injector, the SCRF catalyst comprising a particulate filter substrate including a plurality of inlet flow channels and a plurality of outlet flow channels, a first washcoat composition deposited on surfaces of inlet flow channels, and a second washcoat composition deposited on surfaces of the outlet flow channels, the first washcoat composition having a different chemical composition from the second washcoat composition, and the first washcoat composition having a lower $NH_3$ storage density than the second washcoat composition, wherein the first washcoat composition comprises a first Cu-zeolite composition, the second washcoat composition comprises a second Cu-zeolite composition, and the first washcoat composition is provided with a lower $NH_3$ storage density than the second washcoat composition by providing a different amount of copper in the first washcoat composition relative to the second washcoat composition.

11. An exhaust aftertreatment system comprising:

an inlet structured to receive a flow of exhaust produced by an engine;

an injector positioned downstream from the inlet and structured to inject reductant into the flow of exhaust; and a selective catalytic reduction filter (SCRF) catalyst positioned downstream from the injector, the SCRF catalyst comprising a particulate filter substrate including a plurality of inlet flow channels and a plurality of outlet flow channels, a first washcoat composition deposited on surfaces of inlet flow channels, and a second washcoat composition deposited on surfaces of the outlet flow channels, the first washcoat composition having a different chemical composition from the second washcoat composition, and the first washcoat composition having a lower $NH_3$ storage density than the second washcoat composition, wherein the first washcoat composition comprises a first Fe-zeolite composition, the second washcoat composition comprises a second Fe-zeolite composition, and the first washcoat composition is provided with a lower $NH_3$ storage density than the second washcoat composition by providing a different amount of iron in the first washcoat composition relative to the second washcoat composition.

12. The system of claim 10, comprising an oxidation catalyst positioned downstream from the inlet and upstream from the injector, and an ammonia slip catalyst positioned downstream from the SCRF catalyst.

13. The system of claim 10, wherein the system does not include a separate SCR catalyst in addition to the SCRF catalyst.

14. The system of claim 10, wherein the first washcoat composition has an ammonia storage of 0.1 to 1 grams of ammonia per liter of catalyst volume.

15. The system of claim 14, wherein the second washcoat composition has an ammonia storage density of 1 to 5 grams per liter of catalyst volume.

16. The system of claim 10, wherein the second washcoat composition has an ammonia storage density of 1 to 5 grams per liter of catalyst volume.

17. The system of claim 16, wherein the first washcoat composition has an ammonia storage of 0.1 to 1 grams of ammonia per liter of catalyst volume.

18. The system of claim 11, comprising an oxidation catalyst positioned downstream from the inlet and upstream from the injector, and an ammonia slip catalyst positioned downstream from the SCRF catalyst.

19. The system of claim 11, wherein the system does not include a separate SCR catalyst in addition to the SCRF catalyst.

20. The system of claim 11, wherein the first washcoat composition has an ammonia storage of 0.1 to 1 grams of ammonia per liter of catalyst volume.

21. The system of claim 20, wherein the second washcoat composition has an ammonia storage density of 1 to 5 grams per liter of catalyst volume.

22. The system of claim 11, wherein the second washcoat composition has an ammonia storage density of 1 to 5 grams per liter of catalyst volume.

23. The system of claim 22, wherein the first washcoat composition has an ammonia storage of 0.1 to 1 grams of ammonia per liter of catalyst volume.

* * * * *